Figure 1:
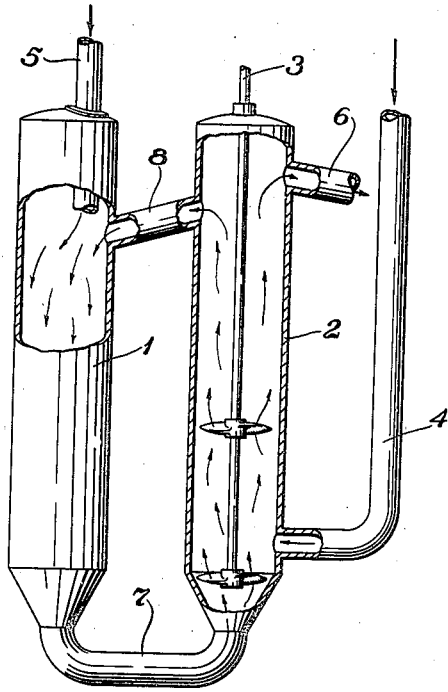
Figure 3:
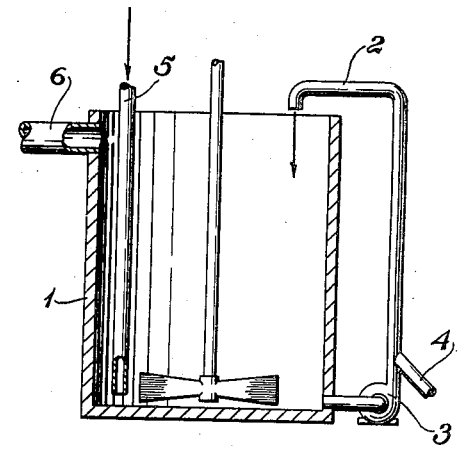
Figure 2:
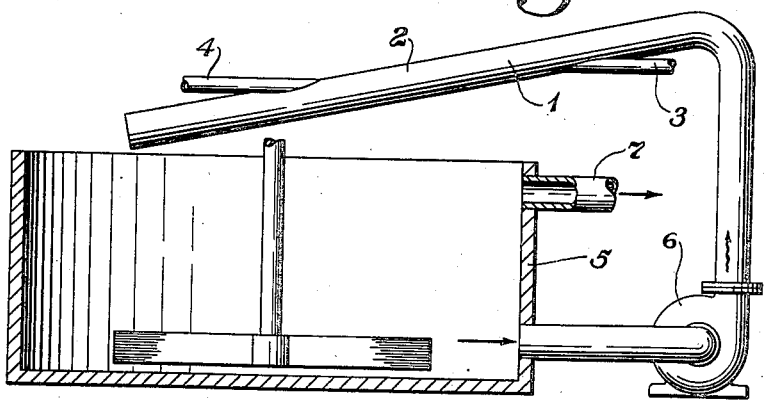

July 8, 1941.                J. P. KOLLER                2,248,632
            LITHOPONE AND PROCESS OF PRODUCING SAME
                    Filed Sept. 24, 1940

Joseph P. Koller
INVENTOR

BY Edwin B. Connolly
ATTORNEY

Patented July 8, 1941

2,248,632

UNITED STATES PATENT OFFICE 2,248,632

LITHOPONE AND PROCESS OF PRODUCING SAME

Joseph P. Koller, Wilmington, Del., assignor to E. I. du Pont de Nemours & Company, Wilmington, Del., a corporation of Delaware Application September 24, 1940, Serial No. 358,074

7 Claims. (Cl. 106—295)

This invention relates to the art of co-precipitated pigment materials. More particularly it relates to the improvement of lithopone pigments. Still more particularly it relates to the production of low grit containing, low sheen and low gloss producing, lithopone pigments of increased flat hiding power.

This is a continuation in part of an application filed by me August 23, 1938, entitled "Lithopone and process of producing same," Serial No. 226,229.

Lithopone is a white pigment composed of substantially equimolecular proportions of zinc sulfide and barium sulfate. In the manufacture of this pigment solutions of zinc sulfate and barium sulfide in approximately equimolecular proportions are mixed and there results a co-precipitate of zinc sulfide and barium sulfate which is known in the art as crude lithopone. This crude lithopone is finished by filtering, washing, calcining to develop its hiding power, suddenly cooling or quenching, and milling to form the finished lithopone of commerce.

The precipitation of crude lithopone has heretofore usually been accomplished by one of three different processes. The first is by a batch process in which a predetermined amount of one of the solutions, preferably the zinc sulfate solution, is first introduced into a large precipitating tank and thereafter a predetermined amount of the other solution is added with constant stirring. The second is by a simultaneous batch process in which both solutions are introduced simultaneously into a large precipitating tank at predetermined rates. The third is by a simultaneous continuous process in which the zinc sulfate and barium sulfide liquors are continuously added to a substantially constant volume of crude lithopone pulp in a precipitating tank while crude pulp is continuously withdrawn from said tank.

While the aforementioned precipitation processes provide crude lithopone which may be finished to produce lithopone eminently suited for use in enamel paint formulations, this lithopone when used in flat paint formulations has undesirably low flat hiding power and produces paint films which for many purposes have undesirably high sheen and gloss. The high sheen and gloss producing characteristics of said prior art lithopones are a direct result of the conditions obtaining in their method of precipitation. Differences in mixing velocity in said precipitation processes cause dfferences in effective reaction velocity and variations in the concentration of the reacting solutions, and this results in the formation of aggregates of crude lithopone primary particles varying widely in size and comprising from as few as one or two primary particles to as high as about 50,000 or more primary particles. Upon subsequent calcination appreciable quantities of pigment aggregates of about 3 microns or less in diameter are produced and said aggregates impart definite gloss and sheen characteristics to paint films, even of the flat paint type used so widely for inside painting.

Attempts have been made in the past to produce low sheen lithopone pigments. For example, one method employed has been to calcine crude lithopone in the presence of relatively large amounts of fritting agents, such as sodium carbonate. This process results in the production of finished lithopone of increased average particle size and the provision of a pigment which in flat paint formulations produces paint films of only moderately high gloss and sheen. At the same time, however, this process increases lithopone grit content markedly so that when the pigment is employed in a flat paint there results a paint film still having the objectionably high sheen and gloss and in addition, having an objectionable number of coarse particles projecting above the surface of the film.

For a better understanding of the characteristics desired in lithopone pigments used in flat paint formulations it will be necessary to explain the various terms used herein and the methods of testing employed:

Flat paint formulation

A flat paint formulation produces a dry paint film in which the binder portion is insufficient to fill all void spaces between pigment particles and as a consequence, has a micro rough surface of relatively low specular reflection. Such a paint has a pigmentation in excess of about 40% by volume on the dry film and usually in excess of about 50% by volume.

On the other hand, an enamel paint formulation produces a dry paint film in which the binder portion is sufficient to fill essentially all void spaces between pigment particles and as a consequence, has a micro smooth surface of relatively high specular reflection. Such a paint has a pigmentation of less than about 35% by volume on the dry film and usually less than about 30% by volume.

Hiding power

Hiding power may be defined qualitatively as that property of a paint which enables it to obliterate beyond recognition any background over which it may be spread. Mathematically, it may be expressed as square feet per gallon of paint. It is usually convenient to measure and express hiding power of a paint in terms of the hiding power of an arbitrary standard paint.

Hiding power is determined by the procedure entitled "Krebs dry film incomplete hiding power," described by Henry A. Gardner in "Physical and Chemical Examination of Paints, Varnishes, Lacquers and Colors," 8th edition, January 1, 1937, pp. 45–51.

In this test the paints being studied are painted out on a surface on which a design of concentric light and dark diamonds is printed. The light and dark bands are ½" wide. Their lightness factors are 75% and 40% respectively. The area of the surface is one square foot. It is printed on heavy paper and then coated with a nitrocellulose lacquer. In applying the paint a 20 cubic centimeter "Luer" type glass syringe and a brush, both being filled with the paint, are weighed together. The paint is spread uniformly over the chart with the syringe and then spread with the brush. The syringe and brush are again weighed. Several brushouts, for example, six or eight, are made with a paint selected as the standard, beginning with five to seven cubic centimeters of paint and increasing the amount in increments of 0.5 to 1.0 cubic centimeter. The application of the paint by volume is merely a guide. The actual weight of the paint applied, as determined by the difference in weight of the syringe and brush before and after application, is used in the calculation. Two or three brushouts of the paints to be compared are then prepared with different quantities of paint such as 6, 7 and 8 cubic centimeters.

When dry, the brushouts are numbered consecutively in the order of increasing quantity of paint for easy identification. The sample brushouts are then located with respect to their degree of hiding by placing each of them between reference standards showing less or more hiding. If possible, the ratings should be estimated in tenths. Thus 2.4 means that the sample is located 0.4 of an interval between standards No. 2 and No. 3.

The hiding power of a paint is calculated as follows:

$$\text{Hiding power} = \frac{\text{volume of standard paint}}{\text{volume of sample paint}} \times 100$$

when the volume of standard paint is that required to give the same contrast as that given by the volume of sample paint.

The following is a specific example of a hiding power determination made by this method:

| | |
|---|---:|
| Weight of standard paint per gal____lbs__ | 15.69 |
| Weight of sample paint per gal_____lbs__ | 13.54 |
| Brushout of sample_____g__ | 5.40 |
| Brushout of standard 1_____g__ | 6.50 |
| Brushout of standard 2_____g__ | 7.40 |
| Sample rating_____ | 1.4 |

Hence, weight of standard paint of equivalent hiding is:

$$6.50 + 0.4(7.4 - 6.5) = 6.86 \text{ g.}$$

The volume of which is:

$$\frac{6.86 \times 8.33}{15.69} = 3.64 \text{ cubic centimeters}$$

The volume of the sample is $$\frac{5.40 \times 8.33}{13.54} = 3.32 \text{ cubic centimeters}$$

The relative hiding power of the sample is:

$$\frac{3.64}{3.32} \times 100 = 110$$

Pigment flat hiding power

Strictly speaking, the expression "hiding power" should only be applied to paint formulae, i. e. to mixtures of pigment and vehicle. Nevertheless, pigments may be said to possess potential hiding power and the potential hiding power of a pigment in a flat paint formulation may be considered to be its flat hiding power. This flat hiding power is defined as follows:

$$\text{F. H. P.} = \frac{\text{Wt. standard pigment per unit vol. standard paint}}{\text{Wt. sample pigment per unit vol. sample paint}} \times \text{H. P.}$$

in which F. H. P. is the flat hiding power of the sample pigment and H. P. is the hiding power of the sample flat paint as determined by the herein described "Krebs dry film incomplete hiding power" procedure.

Angle of sheen

Gloss is defined as the ability of a surface to reflect light specularly and the gloss or sheen of a painted surface is usually measured qualitatively by observing how good a mirror the particular surface may be. While various instruments, such as the Hunter glossmeter, Pfund glossimeter, Ingersoll glarimeter, Sward-Levy gloss comparator, Hunter gloss comparator, and the like, have been devised for measuring quantitatively the gloss of dried paint films, none can be employed for the measurement of the gloss of extremely flat paint films. As a consequence a test for the actual sheen or gloss of extremely flat or low sheen paint films has been developed for the determination of the low sheen producing properties of the novel pigment of this invention. In particular, sheen is defined as the maximum angle from the horizontal, the angle of incidence and of view being equal, at which an image becomes apparent when a dried paint film prepared in a specified manner is viewed under definite conditions, and is determined in the following manner:

1.5 grams of lithopone and 1.2 cubic centimeters of a vehicle consisting of "Z" body kettle bodied linseed oil, petroleum spirits as defined by A. S. T. M. Tentative Standard D–235–26T issued 1926, cobalt naphthenate drier, and lead naphthenate drier, in the proportions of 33.2 parts by weight "Z" body kettle bodied linseed oil, 66.8 parts by weight petroleum spirits, 0.13 part by weight 6% cobalt naphthenate drier, and 0.33 part by weight 24% lead naphthenate drier, are worked into a smooth paste on a smooth glass plate with a spatula having a flexible blade (21/32 by 6 inches). The paste is given 50 double rubs, using strokes about 12 inches long and collecting and re-spreading the paste after each 10 rubs. A uniform film of the paste is made on a glass slide by drawing over the paste a 3½ inch doctor blade, both ends of which are resting on steel strips 0.0015 inch thick. The film on the glass slide is allowed to dry in a dust-free atmosphere and is then graded for sheen by placing it in a horizontal position on a stand in an enclosed box of which the inner walls are painted dead black to avoid extraneous reflections, said box having two openings, one inch in diameter, on opposite sides thereof, situated at an equal distance from the bottom of said box and within two inches of the top thereof, and being equidistant from the center of the paint film. One opening, which is exposed to north light, has a ¼" grille situated therein. The paint film is observed through the other opening for an image reflection of the grille, the stand being raised by an externally motivated lever until an image reflection of the grille is just observable on the slide, the angle of incidence and of view, i. e. the angle from the horizontal bounded by the surface of the film and a line drawn from the center of the film to the eye of the observer, being read on an externally situated scale, the pointer of which is motivated by the film supporting stand. This maximum angle from the horizontal at which the image is just observable, is defined herein and in the appended claims as "angle of sheen". The lower said angle of sheen the lower the sheen and gloss producing properties of the pigment under test and hence the more desirable it is for use in flat paint formulations.

Ground paint pigment particle size

The term "ground paint pigment particle size," as used herein and in the appended claims, refers to the size of the pigment particles of a dried finished pigment in a paint composition prepared by grinding pigment and paint vehicle under specified conditions. More particularly it relates to the number of pigment particles in said paint compositions which are larger than 4 microns and those which are larger than 15 microns.

In determining ground paint pigment particle size, 500 grams pigment and 250 grams of a linseed oil vehicle consisting of "Z" body kettle bodied linseed oil, petroleum spirits as defined by A. S. T. M. tentative standard D–235–26T issued 1926, cobalt naphthenate drier and lead naphthenate drier in the proportions of 52 parts by weight "Z" body kettle bodied linseed oil, 48 parts by weight petroleum spirits, 0.5 part by weight 6% cobalt naphthenate drier and 1.25 parts by weight 24% lead naphthenate drier, are mixed for 20 minutes in a pony mixer catalog number 230, described by Kent Machine Works of Brooklyn, N. Y., and having a pot 7 inches in diameter and 5 inches deep rotating at the rate of 60 revolutions per minute, the paddles of said pony mixer rotating at the rate of 64 revolutions per minute in the reverse direction. The resultant paste is passed once through a three roll paint roller mill with rolls set 0.0015 inch apart, said rolls being 12 inches long and having a diameter of 6 inches. 600 grams of the ground paste is stirred with 150 grams of the aforementioned linseed oil vehicle and a sample of the resultant paint is diluted to a concentration of 5 grams pigment per liter by stirring with an additional amount of said linseed oil vehicle. The resultant thinned paint is placed in a 100 micron deep glass cell and examined at 500 diameters magnification using transmitted light from a carbon arc. A pigment which by this test shows more than about 1500 particles per 0.00025 cubic centimeter of thinned paint that are larger than 4 microns in diameter and less than about 10 particles per 0.00025 cubic centimeter of thinned paint that are larger than 15 microns in diameter has outstanding and heretofore unrealized properties in flat paint formulations. A pigment which shows more than about 1200 particles larger than 4 microns and less than about 10 particles larger than 15 microns per 0.00025 cubic centimeter is also a superior pigment for use in flat paint formulations.

Texture

The values for texture are determined according to modification A of the "Krebs texture test for pigments" outlined on pages 511–512 of the 8th edition of "Physical and Chemical Examination of Paints, Varnishes, Lacquers and Colors," by Henry A. Gardner, January, 1937. This test is as follows:

A spatula with a flexible blade (1½ by 6½ inches) is used to mix the pigment with a quick drying varnish of fairly good wetting properties. The amount of pigment and varnish will vary with the nature of the pigment. For lithopone, about 1.5 grams of pigment is used and 1.5 cubic centimeters of varnish. The paste is given 50 double rubs, using strokes about 12 inches long. The paste is collected and respread after each 10 rubs. A wedge-shaped film is made on glass by drawing a 3½ inch doctor blade, one end of which is resting on a steel strip 0.003 inch thick, over the paint. The film is allowed to dry in a dust-free atmosphere and then examined under illumination at grazing incidence, using a high intensity microscope lamp. Grading is most conveniently done against standards and is based on the size and number of coarse particles projecting from the thin portion of the wedge film.

The value for texture thus obtained is a measure of the number of particles of the order of 10 microns. The standards which I use range from "1" at the bottom of the scale, representing a film containing a large number of 10 micron particles and with a sand-like appearance, to "17" at the top of the scale representing a film with practically no perceptible coarse particles. The intermediate standards represent gradual and evenly spaced graduations from one extreme to the other.

Paint grit

The values for paint grit are determined by a convenient and practical test for the semi-quantitative determination of coarse particles which consists in mixing 250 grams lithopone with 93.8 grams of a quick drying varnish. The resultant paste is passed once through a roll mill with the rolls set 0.0015 inch apart. Steel strips are used for setting the mill and are withdrawn before grinding. The ground paste is reduced to paint consistency by addition of 54 grams of the varnish to 300 grams of the paste and is allowed to stand 16 hours. A uniform film of the paint is made on glass by drawing over the paint a 3½ inch doctor blade both ends of which are resting on steel strips 0.0015 inch thick. The film is allowed to dry in a dust-free atmosphere and is then examined under illumination at grazing incidence, using a high intensity microscope lamp, and compared for film fineness and for the presence of coarse gritty aggregates against a set of arbitrary standards. The standards which I use range from "1" at the bottom of the scale, representing a film with extremely coarse particles and sand-like in appearance to "16" at the top of the scale, representing a film with practically no perceptible coarse particles. The intermediate standards represent gradual and evenly spaced graduations from one extreme to the other.

The value for paint grit thus obtained is a measure of the number and size of particles protruding above the surface of the film, and is especially a measure of the quantity of grit particles of the order of from about 20 to about 40 microns.

Having explained the terms to be used herein I can now proceed with a detailed description of my invention.

This invention has as an object the manufacture of improved lithopone pigments which in flat paint formulations produce paint films having desirable low sheen to an extent heretofore unrealized. A further object is to provide improved low sheen lithopone pigments having good texture and grit properties. A still further object is to improve the flat hiding power of lithopone pigments to a considerable extent. Additional objects will become apparent from an examination of the following description and claims.

These objects are attained by the following invention which broadly comprises introducing barium sulfide solution and zinc sulfate solution into a precipitation device at appreciably separated points, to provide one or more zones comprising excess barium sulfide and one or more zones comprising excess zinc sulfate, and recirculating the precipitated crude lithopone slurry so that said crude lithopone repeatedly and alternately comes into contact with an excess barium sulfide zone and an excess zinc sulfate zone. The crude lithopone so produced is uniform in particle size, has a granular structure, settles and filters more rapidly than do prior art crude lithopones, and on subsequent calcination produces a finished lithopone having a hitherto unrealized low angle of sheen, improved flat hiding power, and excellent texture and grid properties.

In a more restricted sense this invention comprises causing substantially equimolecular quantities of barium sulfide and zinc sulfate in solution to flow concurrently and at substantially constant predetermined rates into a mixing or precipitation device from which such an amount of the contents is continuously withdrawn so as to maintain a substantially constant volume of crude lithopone pulp in the precipitation or mixing device. The barium sulfide and zinc sulfate solutions are introduced into said device through inlets which are separated by an appreciable distance and of which one or both are within the body of the crude lithopone slurry. The crude lithopone slurry is recirculated in the container in such a manner that the crude lithopone particles are subjected repeatedly and alternately to zones of relatively high barium sulfide and high zinc sulfate concentrations. The crude lithopone obtained when subjected to subsequent treatment produces a finished lithopone having an angle of sheen of not more than about 30°, a paint grit of not less than about 11, a texture of not less than about 12, a flat hiding power at least about 10% higher than that of prior art lithopones, and showing more than 1200 particles that are larger than 4 microns and less than 10 particles that are larger than 15 microns per 0.00025 cubic centimeter of thinned paint when tested by the hereinbefore described ground paint pigment particle size test.

In describing my invention in detail I shall first describe the illustrated precipitation devices embodying it in its preferred forms so far as it relates to apparatus, but although I describe the invention by reference to such illustrated apparatus it will be understood that I do not restrict it thereto. In the accompanying drawing of these precipitation devices:

Fig. I is a diagrammatic illustration of one preferred arrangement of apparatus adapted for the practice of the invention.

Fig. II is a diagrammatic illustration of another arrangement of apparatus adapted for the practice of the invention.

Fig. III is a diagrammatic illustration of still another arrangement of apparatus adapted for the practice of the invention.

The apparatus illustrated in Figure I comprises a precipitating device consisting of two cylindrical tanks 1 and 2 with connecting means 7 and 8 to permit recirculation between said tanks, impeller means 3 located within tank 2, inlet pipe 4 discharging near the bottom of tank 2, and inlet pipe 5 discharging near the top of tank 1, and an outlet pipe 6.

In practicing my invention in apparatus such as that illustrated in Figure I, barium sulfide solution is flowed continuously at a substantially constant rate into the precipitating device through inlet pipe 4 or 5, preferably 5. Similarly, zinc sulfate solution is flowed continuously into the mixing tank through inlet pipes 5 or 4. The crude lithopone pulp in the precipitating device is agitated and circulated continuously through the tubular member 2 by the impeller means 3. The pulp level in tank 2 is preferably kept at a constant point, near tank full, and pulp is withdrawn continuously through the overflow pipe 6.

The apparatus illustrated in Fig. II comprises a pipe 1, having attached to its inner surface a spiral baffle 2 as shown, inlet pipe 3 and 4 as shown, a mixing tank 5 positioned below the pipe 1, means 6 of circulating the crude lithopone pulp through the pipe 1 and an overflow launder 7 connecting with a finishing tank not shown.

In practicing my invention in apparatus such as is illustrated in Fig. II, barium sulfide solution is flowed continuously at a substantially constant rate into the pipe 1 through inlet pipe 3 or 4, preferably 3. Similarly, zinc sulfate solution is flowed continuously into the pipe 1 through inlet tubes 4 or 3 while crude lithopone pulp is circulated continuously through the pipe 1 by the circulating means 6. The pulp level in the tank 5 is preferably kept at a constant point, nearly tank full, and pulp is withdrawn continuously through the overflow launder 7 connecting with a finishing tank not shown.

The apparatus illustrated in Fig. III comprises a mixing tank 1, a tubular recirculating means 2, an impeller means 3, inlet pipes 4 and 5 substantially as shown and an overflow launder 6 connecting with a finishing tank not shown.

In practicing my invention in apparatus such as is illustrated in Fig. III barium sulfide solution is flowed continuously at a substantially constant rate through inlet pipes 4 or 5, preferably 4. Similarly, zinc sulfate solution is flowed continuously through inlet pipes 5 or 4 while the crude lithopone pulp is circulated continuously by the impeller means 3 through the tubular recirculating means 2. The pulp level in the tank 1 is preferably kept at a constant point, nearly tank full, and pulp is withdrawn continuously through the overflow launder 6 connecting with a finishing tank not shown.

Various arrangements and selections of equipment for the operation of my novel process are possible. In the preferred arrangement, however, I employ an arrangement of apparatus such as is illustrated in Fig. I, in which tanks 1 and 2 have a diameter of 12 inches and a height of 3 or 4 feet. Barium sulfide solution at a substantially constant temperature in the range from about 60° C. to about 80° C., containing a substantially constant amount of BaS in the range of from about 150 to about 300 grams BaS per liter, is flowed continuously at a substantially constant rate in the range of from about 35 to about 75 liters per minute into the top of tank 1 through inlet tube 5 while zinc sulfate solution at a substantially constant temperature in the range of from about 40° C. to about 55° C., containing a substantially constant amount of $ZnSO_4$ in the range of from about 300 to about 600 grams $ZnSO_4$ per liter, is flowed continuously into the bottom of tank 2 through inlet tube 4 at a substantially constant rate so that the pH of the overflow crude lithopone slurry is in the range of from about 3.5 to about 10, said slurry having a substantially constant temperature in the range of from about 85° C. to about 95° C. The impeller means 3 comprising two 6½ in. agitator blades is rotated at a substantially constant speed in the range of from about 800 to about 1800 revolutions per minute in such a direction as to provide an upward thrust in tank 2, causing a rapid circulation of the crude lithopone pulp so that the particles of said crude lithopone alternately and repeatedly encounter a zone of excess barium sulfide within tank 1 and a zone of excess zinc sulfate near the bottom of tank 2. Crude lithopone pulp is allowed to overflow at a substantially constant rate through outlet pipe 6 and is then conducted to a finishing tank where it is then finished in the usual manner, being adjusted to a pH of between about 7 and about 9 by addition of appropriate small amounts of barium sulfide or zinc sulfate solutions, and is subsequently filtered, dried, calcined, quenched, wet milled, filtered, dried, and dry milled to provide an improved finished lithopone of commerce.

While I prefer to employ continuous addition of the reactants and continuous withdrawal of the lithopone, it is to be understood that desirable results accrue from the herein described invention when continuous addition of one or/and the other reactant is resorted to, in conjunction with intermittent withdrawal of the lithopone.

The following example is given for illustrative purposes and is not intended to place any restriction on the herein described invention:

Using an arrangement of apparatus designed as shown in Fig. I, with tanks 1 and 2 each having a diameter of 12 in. and a height of 4 feet, 175.2 grams per liter barium sulfide solution at 78° C. was fed through inlet tube 5 at a rate of 62.2 liters per minute while 350.9 grams per liter zinc sulfate solution at 50° C. was fed through inlet tube 4 at a rate of 29.6 liters per minute. The impeller means 3 comprising two 6½ in. agitator blades attached to the shaft at the points shown was caused to revolve at 1150 revolutions per minute in such a direction as to provide an upward thrust in tank 2 causing rapid circulation of the crude lithopone pulp so that the particles of said crude lithopone alternately and repeatedly encountered a zone of excess barium sulfide and a zone of excess zinc sulfate. Crude lithopone pulp having a pH of 7 and a temperature of 88° C. was allowed to overflow at a substantially constant rate through outlet 6. Said crude lithopone, which was uniform in particle size, had a granular structure and settled and filtered 50% faster than did prior art crude lithopone. Said lithopone was adjusted to a pH of 8.8 by addition of appropriate small amounts of barium sulfide solution. Subsequently it was filtered, dried to 5% moisture content, calcined at 600° C. in a furnace such as described in U. S. Patent 1,584,381, and quenched by spraying with water and immediately thereafter dropping it into a quenching body of water. The calcined lithopone was wet milled, filtered, dried, and dry milled. The resultant finished lithopone had an angle of sheen of 18°, a texture of 14, a paint grit of 13, a flat hiding power 15% greater than that of any prior art lithopone, and showed 1680 particles larger than 4 microns and 4 particles larger than 15 microns per 0.00025 cubic centimeter of thinned paint when tested by the hereinbefore described ground paint pigment particle size test. So-called low sheen lithopones made by prior art processes such as herein described, have angles of sheen of from about 35 to 50°, textures of from about 6 to 9, paint grits of from about 1 to 4, and show less than about 500 particles larger than 4 microns and more than about 20 particles larger than 15 microns per 0.00025 cubic centimeter when tested by the ground paint pigment particles size test. In other words, prior art low sheen lithopones are coarse and gritty and at the same time do not produce paint films of sufficiently low sheen. Prior art lithopones having texture and paint grit properties equal to those of the aforementioned novel lithopone of my invention produce glossy paint films, having angles of sheen of from about 60° to 90°.

It is to be understood that the herein disclosed specific embodiments of my invention may be subjected to variation and modification without departing from the scope of this invention. For instance, while I prefer to employ a precipitating device such as that illustrated in Fig. I, other types of precipitating devices may be used provided the particles of precipitated crude lithopone alternately and repeatedly come in contact with a zone of restricted dimensions comprising an excess of one reactant and then a zone comprising an excess of the other reactant.

The optimum degree of circulation of the crude lithopone slurry and the optimum number of times the particles of crude lithopone are subjected alternately to zones of excess barium sulfide and zones of excess zinc sulfate will vary with the concentration of barium sulfide and zinc sulfate in said zones, the properties required in the finished lithopone pigment etc. Lithopone having a low angle of sheen and high flat hiding power is obtained when the crude lithopone particles pass alternately through zones of excess barium sulfide and excess zinc sulfate, or vice versa, about twice. Increased effects are obtained when the crude lithopone particles pass alternately through zones of excess barium sulfide and excess zinc sulfate, or vice versa, for an average of as many as about 50 or even about 100 times or more. Ordinarily, however, I prefer to subject the crude lithopone to an average of from about 5 to about 35 passes through said zones.

The concentrations of barium sulfide and zinc sulfate solutions employed in my novel process can be varied over a wide range although I prefer to employ solutions of the concentrations normally employed in lithopone manufacture. The optimum concentrations of barium sulfide and zinc sulfate in the excess zones can best be learned by experimental trial. Appreciable effects are obtained when the maximum concentrations of barium sulfide and zinc sulfate in said zones are as low as about 0.1 gram and 0.2 gram per liter respectively. For increased effects maximum concentrations in said zones are as high as about 450 grams of barium sulfide per liter and about 700 grams of zinc sulfate per liter may be employed. For ordinary purposes, however, excess zones having a maximum barium sulfide concentration in the range of from about 1 to about 300 grams BaS per liter, preferably about 30 to about 250 grams per liter, and zinc sulfate excess zones having a maximum zinc sulfate concentration in the range of from about 2 to about 600 grams $ZnSO_4$ per liter, preferably about 60 to about 450 grams per liter.

The proportions of barium sulfide to zinc sulfate employed must be such that the pH of the crude lithopone slurry product of my process has a substantially constant pH in the range of between about 3.5 and about 10, and for most ordinary purposes, it is preferred that the proportions of barium sulfide to zinc sulfate shall be such that said slurry has a substantially constant pH in the range of about 7 to about 8. Furthermore, it is preferred that said crude lithopone should be adjusted in the finishing tank to a pH of between about 7 and about 9 by addition of appropriate small amounts of barium sulfide or of zinc sulfate prior to filtration thereof, although it is to be understood that the pH to which said crude lithopone is adjusted may be varied over wide limits, as for example, a pH in the range of from about 4 to about 12.

The optimum temperatures of the barium sulfide and zinc solutions and of the reaction mixture resulting from the exothermic reaction between said solutions can best be learned by experimental trial. It is preferred that the reacting solutions shall be at such temperatures that the crude lithopone slurry product of my novel process shall be at a substantially constant temperature in the range of about 85° C. to about 95° C. To this end it is preferred that the barium sulfide solution shall be at a substantially constant temperature in the range of about 60° C. to about 80° C. and that the zinc sulfate solution shall be at a substantially constant temperature in the range of about 40° C. to about 55° C. It must be understood, however, that satisfactory low sheen lithopone pigments are obtained by my novel process when the crude slurry temperature is outside the range of about 85° C. to about 95° C. However, I do not prefer to employ temperatures below about 85° C. or above about 95° C. since at the lower temperatures the filtration rate of said crude slurry is affected adversely and at higher temperatures, such as the temperature of boiling of the lithopone slurry, difficulty is experienced in controlling the circulation of the reaction mixture.

The novel crude lithopone obtained by the hereinbefore described process may be calcined and quenched by any of the processes well known in the art. However, I prefer to effect calcination in a continuous rotary externally heated calciner, spraying water on to the hot lithopone as it issues from the calciner, and thereafter dropping said lithopone immediately into a quenching body of water.

Minor decreases in angle of sheen and minor increases in flat hiding power are generally of little industrial importance. Therefore, it is to be understood that my novel process should be practiced in such a manner that a finished lithopone is produced having an angle of sheen of not more than about 30°, a paint grit of not less than about 11, a texture of not less than about 12, a flat hiding power of at least about 10% greater than that of prior art lithopones, and showing more than about 1000 particles that are larger than 4 microns and less than about 10 particles that are larger than 15 microns per 0.00025 cubic centimeter of thinned paint when tested by the herein described ground paint pigment particle size test. Preferably, my process should be practiced in such a manner that the resultant finished lithopone has an angle of sheen of not more than about 20°, a paint grit of not less than about 14, a texture of not less than about 13, a flat hiding power of at least about 15% greater than that of prior art lithopones, and showing more than about 1500 particles that are larger than 4 microns and less than about 10 particles that are larger than 15 microns per 0.00025 cubic centimeter of thinned paint when tested by the ground paint pigment particle size test.

The theory of the invention is that when the crude pigment particles are subjected alternately and repeatedly to barium sulfide and zinc sulfate excess zones each particle is coated, for example, with a layer of BaS molecules, which are converted to lithopone on encountering the zinc sulfate excess zone and which in turn provides a layer of $ZnSO_4$ molecules, etc. It is obvious that the excesses must be controlled since too small an excess would cause too small an addition to the original crude lithopone particle before it overflowed while too large an excess would form only large numbers of new single unit particles. A proper balance will gradually enlarge the original particle as long as it recirculates and until it overflows. It is necessary that the average particle should recirculate long enough to grow to a sufficiently large size to effect the desired sheen in the final product. A particle grown in this manner, while consisting of layers of particles relatively loosely held, possesses sufficient strength to remain a unit even after calcination and therefore is large enough to effect the desired sheen in the final paint film and yet is small enough not to harm the appearance of the film to the eye, that is, it is small enough to be below the resolving power of the eye, although the composite effect of the innumerable particles is a decided lowering of the sheen of the paint film.

My novel process possesses advantages not previously combined in a single process. Furthermore, the lithopone product of my process possesses advantages not previously combined in a single pigment material. For example, my novel process allows the production of finished lithopone pigments which, when incorporated in flat paint formulations, produce lithopone flat paints which form smooth films of hitherto unrealized low sheen and high hiding power. Furthermore, lithopone pigments of any predetermined angle of sheen and having hitherto unobtained flat hiding power, excellent texture, and paint grit, may be produced by my process, thus permitting the formulation of lithopone flat paints of markedly superior hiding power, excellent texture and grit, and of any predetermined sheen characteristic.

As many apparently widely different embodiments of this invention may be made without departing from the spirit and scope thereof, it is to be understood that I do not limit myself to the specific embodiments except as defined in the appended claims.

Having disclosed the present invention the following is claimed as new and useful:

1. In the precipitation of lithopone from barium sulfide and zinc sulfate, said lithopone when calcined and incorporated into coating composition vehicles producing a paint which forms dry paint films having a hiding power 15% greater than normal lithopone, having good texture, and having an angle of sheen of not more than 30° as determined by the angle of sheen test, the step which comprises recirculating the precipitated crude lithopone particles alternately and repeatedly through a zone containing an excess of one of the reactants, said zone being adjacent to the point of discharge of said reactant, and then through a second zone containing an excess of the other reactant, said second zone being adjacent to the point of discharge of said second reactant.

2. In the precipitation of lithopone from barium sulfide and zinc sulfate, said lithopone when calcined and incorporated into coating composition vehicles producing a paint which forms dry paint films having a hiding power 15% greater than normal lithopone, having good texture, and having an angle of sheen of not more than 30° as determined by the angle of sheen test, the step which comprises recirculating the precipitated crude lithopone particles alternately and repeatedly for an average of at least about 2 times to about 100 times through a zone containing an excess of one of the reactants, said zone being adjacent to the point of discharge of said reactant, and then through a second zone containing an excess of the other reactant, said second zone being adjacent to the point of discharge of said second reactant.

3. In the precipitation of lithopone from barium sulfide and zinc sulfate, said lithopone when calcined and incorporated into coating composition vehicles producing a paint which forms dry paint films having a hiding power 15% greater than normal lithopone, having good texture, and having an angle of sheen or not more than 30° as determined by the angle of sheen test, the step which comprises recirculating the precipitated crude lithopone particles alternately and repeatedly for an average of at least about 2 times to about 100 times through a zone containing an excess of one of the reactants, said zone being adjacent to the point of discharge of said reactant, and then through a second zone containing an excess of the other reactant, said second zone being adjacent to the point of discharge of said second reactant, the maximum barium sulfide concentration within said zone ranging from about 0.1 gram to about 450 grams per liter while the maximum concentration of the zinc sulfate ranges from about 0.2 gram to about 700 grams per liter.

4. In the precipitation of lithopone from barium sulfide and zinc sulfate, said lithopone when calcined and incorporated into coating composition vehicles producing a paint which forms dry paint films having a hiding power 15% greater than normal lithopone, having good texture, and having an angle of sheen of not more than 30° as determined by the angle of sheen test, the steps which comprise reacting a solution of barium sulfide, said solution having a temperature between about 60° C. and about 80° C., with a solution of zinc sulfate, said solution having a temperature between about 40° C. and about 55° C., recirculating the precipitated crude lithopone particles alternately and repeatedly for an average of at least about 2 times to about 100 times through a zone containing an excess of one of the reactants, said zone being adjacent to the point of discharge of said reactant, and then through a second zone containing an excess of the other reactant, said second zone being adjacent to the point of discharge of said second reactant, the maximum barium sulfide concentration within said zone ranging from about 0.1 gram to about 450 grams per liter while the maximum concentration of the zinc sulfate ranges from about 0.2 gram to about 700 grams per liter.

5. In the precipitation of lithopone from barium sulfide and zinc sulfate, said lithopone when calcined and incorporated into coating composition vehicles producing a paint which forms dry paint films having a hiding power 15% greater than normal lithopone, having good texture, and having an angle of sheen of not more than 30° as determined by the angle of sheen test, the steps which comprise reacting a solution of barium sulfide, said solution having a temperature between about 60° C. and about 80° C., with a solution of zinc sulfate, said solution having a temperature of between about 40° C. and about 55° C., the amount of barium sulfide and zinc sulfate which is used being such that the crude lithopone has a pH of between about 3.5 and about 10, recirculating the precipitated crude lithopone particles alternately and repeatedly for an average of at least about 2 times to about 100 times through a zone containing an excess of one of the reactants, said zone being adjacent to the point of discharge of said reactant, and then through a second zone containing an excess of the other reactant, said second zone being adjacent to the point of discharge of said second reactant, the maximum barium sulfide concentration within said zone ranging from about 0.1 gram to about 450 grams per liter while the maximum concentration of the zinc sulfate ranges from about 0.2 gram to about 700 grams per liter.

6. In the precipitation of lithopone from barium sulfide and zinc sulfate, said lithopone when calcined and incorporated into coating composition vehicles producing a paint which forms dry paint films having a hiding power 15% greater than normal lithopone, having good texture, and having an angle of sheen of not more than 30° as determined by the angle of sheen test, the step which comprises recirculating the precipitated crude lithopone particles alternately and repeatedly for an average of at least about 5 times to about 35 times through a zone containing an excess of one of the reactants, said zone being adjacent to the point of discharge of said reactant, and then through a second zone containing an excess of the other reactant, said second zone being adjacent to the point of discharge of said second reactant, the barium sulfide concentration within said zone ranging from about 30 to about 250 grams per liter and the zinc sulfate concentration within said zone ranging from about 60 to about 450 grams per liter.

7. In the precipitation of lithopone from barium sulfide and zinc sulfate, said lithopone when calcined and incorporated into coating composition vehicles producing a paint which forms dry paint films having a hiding power 15% greater than normal lithopone, having good texture, and having an angle of sheen of not more than 30° as determined by the angle of sheen test, the steps which comprise reacting a solution of barium sulfide, said solution having a temperature between about 60° C. and about 80° C., with a solution of zinc sulfate, said solution having a temperature of between about 40° C. and about 55° C., the amount of barium sulfide and zinc sulfate which is used being such that the crude lithopone has a pH of between about 3.5 and about 10, recirculating the precipitated crude lithopone particles alternately and repeatedly for an average of at least about 5 times to about 35 times through a zone containing an excess of one of the reactants, said zone being adjacent to the point of discharge of said reactant, and then through a second zone containing an excess of the other reactant, said second zone being adjacent to the point of discharge of said second reactant, the maximum barium sulfide concentration within said zone ranging from about 30 grams to about 250 grams per liter while the maximum concentration of the zinc sulfate ranges from about 60 grams to about 450 grams per liter.

JOSEPH P. KOLLER.